United States Patent
Ikeda

[11] Patent Number: 6,112,788
[45] Date of Patent: Sep. 5, 2000

[54] PNEUMATIC TIRE INCLUDING GROOVES HAVING RIBS THEREIN

[75] Inventor: Akio Ikeda, Kobe, Japan

[73] Assignee: Sumitomo Rubber Industries, Ltd., Hyogo-Ken, Japan

[21] Appl. No.: 09/021,561

[22] Filed: Feb. 10, 1998

[30] Foreign Application Priority Data

Feb. 14, 1997 [JP] Japan ........................................ 9-30737

[51] Int. Cl.$^7$ .......................... B60C 11/13; B60C 101/00; B60C 115/00
[52] U.S. Cl. ................................ 152/209.19; 152/209.25; 152/209.28
[58] Field of Search ........................ 152/209 G, 209 GB, 152/209.18, 209.19, DIG. 1, 209.25, 209.28

[56] References Cited

U.S. PATENT DOCUMENTS

| | | | |
|---|---|---|---|
| 2,164,819 | 7/1939 | Hicks et al. ......................... | 152/209.25 |
| 2,260,193 | 10/1941 | Overman . | |
| 2,268,344 | 12/1941 | Shesterkin et al. . | |
| 2,605,807 | 8/1952 | Wittmer .............................. | 152/209.19 |
| 2,708,957 | 5/1955 | Constantakis et al. ............. | 152/209.25 |
| 3,682,220 | 8/1972 | Verdier . | |
| 4,687,037 | 8/1987 | Pfeiffer et al. . | |
| 5,375,639 | 12/1994 | Suzuki et al. . | |
| 5,417,269 | 5/1995 | Kinoshita et al. . | |
| 5,450,885 | 9/1995 | Hanya . | |

FOREIGN PATENT DOCUMENTS

| | | |
|---|---|---|
| 602989 | 6/1994 | European Pat. Off. . |
| 1079466 | 11/1954 | France . |
| 3619149A1 | 12/1987 | Germany . |
| 4220677A1 | 1/1993 | Germany . |
| 5-16617 | 1/1993 | Japan . |
| WO 95/18022 | 7/1995 | WIPO . |

*Primary Examiner*—Steven D. Maki
*Attorney, Agent, or Firm*—Birch, Stewart, Kolasch & Birch, LLP

[57] ABSTRACT

A pneumatic tire comprises a tread portion provided with a plurality of longitudinal grooves, each of the longitudinal grooves extending continuously in the tire circumferential direction and having a bottom and a pair of sidewalls defining corners therebetween, the corners being rounded by a circular arc whose radius is not more than 2 mm, the inclination angles of the sidewalls being in the range of not more than 15 degrees with respect to the normal direction to the tread surface line, the bottom being provided with a plurality of ribs which extend in the longitudinal direction of the groove in substantially parallel with each other so that the bottom has a wavy configuration having no angled corner, the heights of the ribs measured from the deepest point of the longitudinal groove being in the range of from 0.5 to 1.0 mm.

6 Claims, 3 Drawing Sheets

PNEUMATIC TIRE INCLUDING GROOVES HAVING RIBS THEREIN

The present invention relates to a pneumatic tire having longitudinal grooves in which small ribs are disposed therein to prevent the groove bottoms from being cracked thereby improving durability.

In general, pneumatic tires are provided with circumferentially extending longitudinal grooves for the purpose of draining water in the ground contact patch.

If the groove width is increased, the drainage increases and wet performance improves. In practice, however, there are many disadvantages associated with increasing the groove width including an increased tendency for cracking.

The conventional way to prevent the groove bottom from being cracked, the corners between the groove bottom and sidewalls are rounded and thus the groove has generally a U or V-shapes cross section.

If the groove width is increased near the groove bottom and thus the cross-sectional shape approaches that of a rectangle, then the cross-sectional area increases and the drainage increases. However, stress is liable to concentrate on the corners and the durability greatly deteriorates. Therefore, U or V-shaped grooves are usually employed.

It is therefore, an object of the present invention to provide a pneumatic tire, in which longitudinal grooves are provided with a generally rectangular cross-sectional shape without deteriorating the resistance to crack.

According to one aspect of the present invention, a pneumatic tire comprises a tread portion provided with a plurality of longitudinal grooves, each of the longitudinal groove extending continuously in the tire circumferential direction and having a bottom and a pair of sidewalls defining corners therebetween, the corners rounded by a circular arc whose radius is not more than 2 mm, the inclination angle of the sidewalls being in the range of not more than 15 degrees to the normal direction to the tread surface line, the bottom provided with a plurality of ribs extending in the longitudinal direction of the groove in substantially parallel with each other so that the bottom has a wavy configuration having no angled corner, and the ribs having a radial height being in the range of from 0.5 to 1.0 mm when measured from the deepest point of the longitudinal groove.

Embodiments of the present invention will now be described in detail in conjunction with the accompanying drawings.

Figure 1:
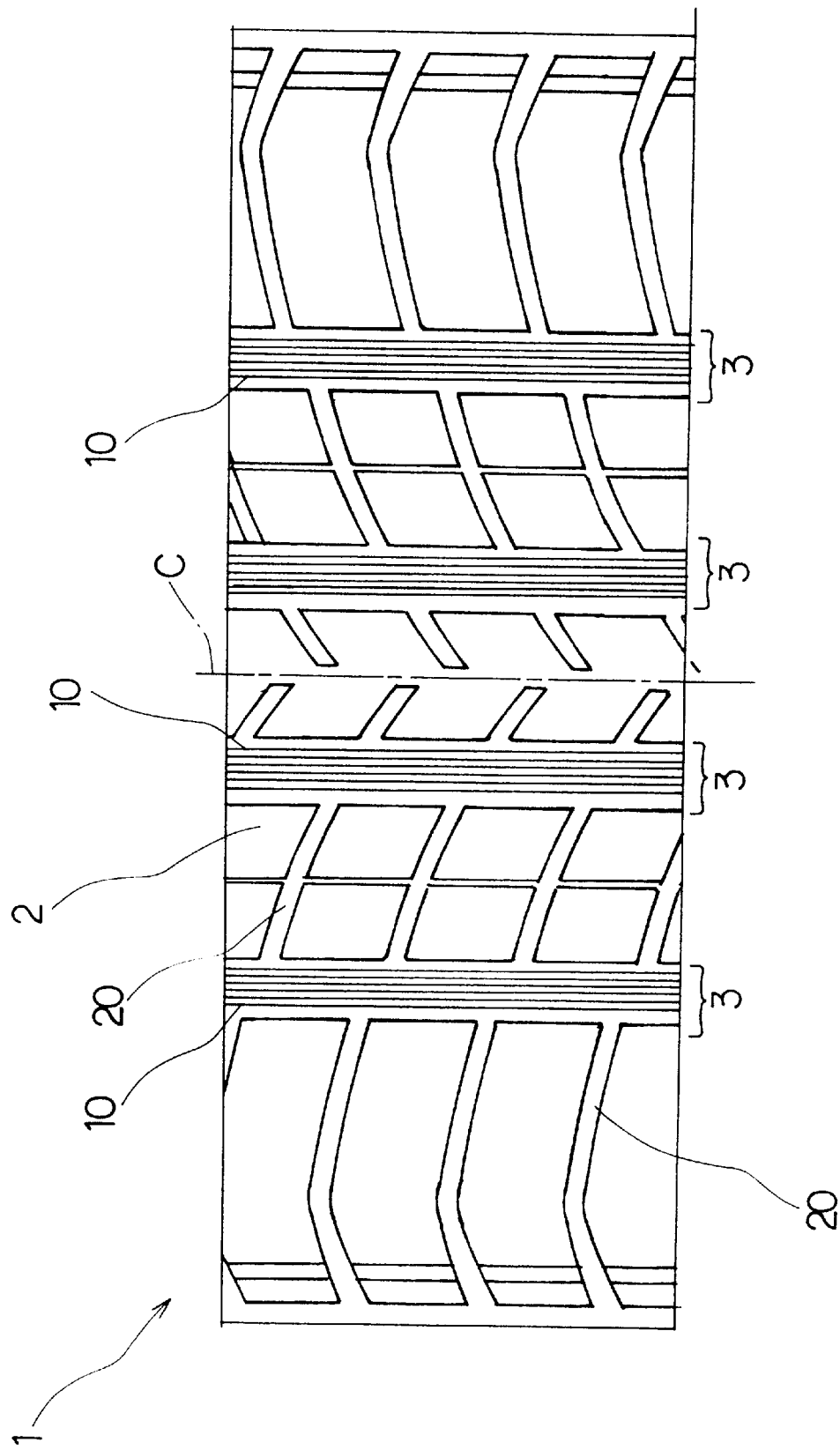
FIG. 1 is a plan view of a tire according to the present invention showing an example of the tread pattern.

In the drawings, the tire 1 according to the present invention is a pneumatic tire for passenger cars.

The tire comprises a tread portion, a pair of axially spaced bead portions, and a pair of sidewall portions extending between the tread edges and the bead portions. The tire is reinforced with a bead core disposed in each of the bead portions, at least one carcass ply extending between the bead portions, and belt cord plies disposed radially outside the carcass and inside a rubber tread.

As shown in FIG. 1, the tread portion 2 is provided with a plurality of longitudinal grooves 3 extending continuously in the circumferential direction and axial groove 20.

The axial grooves 20 extend from an axial position near the tire equator C to the tread edges E while describing a gentle curve.

In this embodiment, the longitudinal grooves 3 are a straight groove, and two grooves 3 are disposed on each side of the tire equator C.

Figure 2:
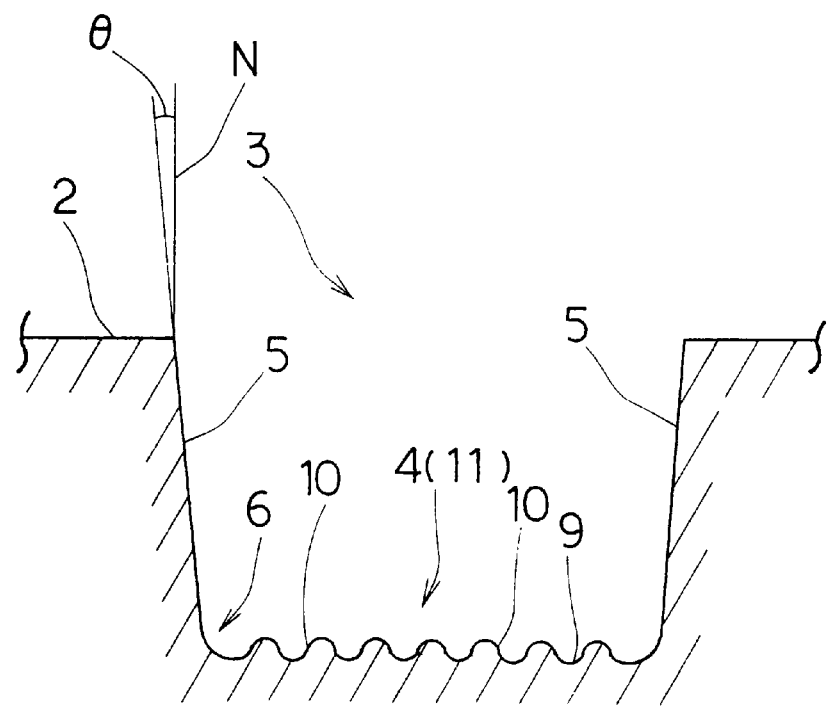
FIG. 2 is a cross sectional view of a longitudinal groove.

In a meridian section of the tire as shown in FIG. 2, the sidewalls 5 of each longitudinal groove 3 has an inclination angle $\theta$ of not more than 15 degrees with respect to a normal line N drawn to the tread surface 2 at the intersecting point of the tread surface line and the groove sidewall line. Accordingly, the cross-sectional shape of the groove 3 is generally a rectangle. In view of the demolding of the tire and stone trapping, the inclination angle $\theta$ is set to be more than 0 degree, but preferably less than about 10 degrees, and the inclining directions are such that the groove width increases radially outward of the tire.

The longitudinal grooves 3 have a groove width of 5 to 20 mm (in this example about 12 mm) at the tread surface, and a groove depth of 6 to 15 mm (in this example about 8 mm).

The corners 6 between the groove sidewalls 5 and the groove bottom 4 are rounded by a circular arc 7 whose radius R1 is not more than 2 mm.

If the radius R1 is more than 2 mm, the longitudinal groove 3 decreases in the cross sectional area, and the water draining performance is liable to decrease.

In general, by setting the corner radius R1 in the range of less than 2 mm, stress is liable to concentrate on the corners 6 and cracks are liable to occur, though the corners 6 are rounded.

In the present invention, therefore, the groove bottom 4 is formed in a wavy configuration. To form such a wavy configuration, the longitudinal grooves 3 are provided in the groove bottom 4 with a plurality of small ribs 10.

The number of the ribs 10 in each groove 3 is set in the range of from 2 to 10, preferably 5 to 8.

The small ribs 10 in each groove 3 extend parallel with each other along the length of the groove 3.

In order to prevent stress from concentrating on the corners 6, it is preferable that the ribs 10 extend continuously in the circumferential direction.

Figure 3:
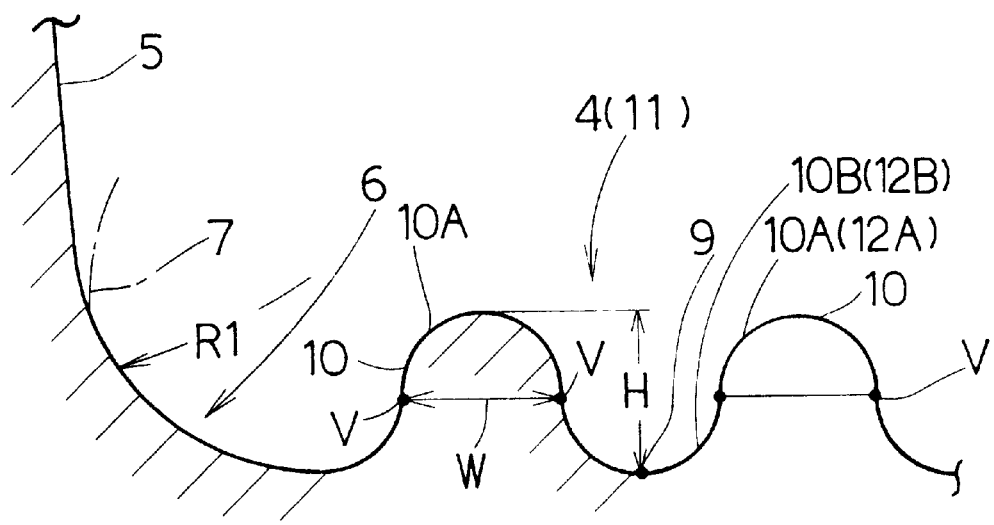
FIG. 3 is an enlarged cross sectional view showing an example of the ribs.

As shown in FIG. 3 the ribs 10 have a height H of 0.5 to 1.0 mm from the deepest point 9 of the groove bottom 4. The widths W of the ribs 10 are set in the range of from 1.0 to 1.5 mm.

If the height H is more than 1.0 mm, heat generation in the tread rubber increases to decrease the high speed durability.

If the widths W are more than 1.5 mm, stress concentrates on the corners 6 and cracks are liable to occur.

If the height H is less than 0.5 mm and/or the widths W are less than 1.0 mm, it becomes difficult to disperse the stress and also difficult to make a mold.

If the number of the ribs 10 is more than 10, the size of the ribs becomes too small, and it becomes difficult to disperse the stress and also difficult to make a mold.

The ribs 10 form alternate ridges 10A and valleys 10B.

In the example of FIG. 3, the ridges 10A and valleys 10B has semicircular cross sections 12A and 12B. The semicircular cross sections 12A and 12B are the substantially same single radius. The convex semicircles 12A and the concave semicircles 12B are connected at points V as inflection points. The width W of the rib 10 is defined between the inflection points V in this case. In addition to the semicircle, sine curve, elliptical curve and the like can be used.

In FIG. 3, the maximum depths measured on both sides of each rib 10 are the same depth. Therefore, this depth is equal to the depth of the deepest point 9 of the longitudinal groove 3. In other words, all the valleys are the same depth.

Figure 4:
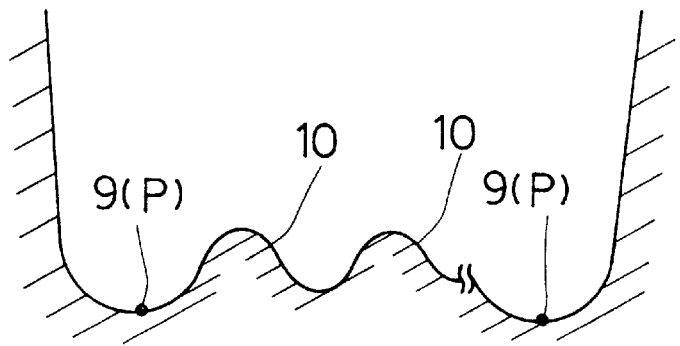
FIGS. 4, 5 and 6 are cross sectional views each showing an example of the ribs.

FIG. 4 shows another example, wherein the deepest points 9 reside in only the outermost valleys.

Figure 5:
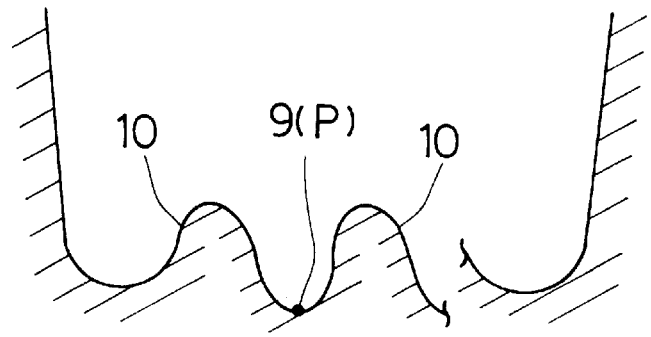

FIG. 5 shows still another example, wherein the deepest points 9 reside in the valleys between the ribs 10.

Figure 6:
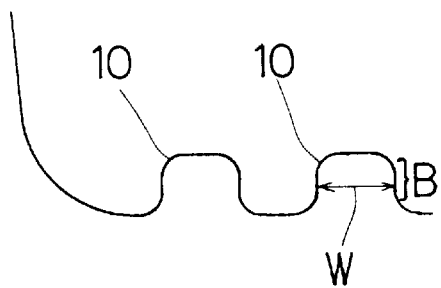

FIG. 6 shows another example of the ribs 10. In this example, the ribs 10 collectively form a configuration like a rectangular wave rather than a sine-wave-like configuration in the former examples. The ribs 10 have perpendicular sidewalls B extending in the greater part of the height. In this case, the width W of the rib is defined between the sidewalls.

With regard to the width of the rib, if not applicable to the above-mention two cases, the width W is defined as the maximum width measured on the radially outside of one of the deepest points of the two valleys adjacent to the rib which is not deeper than the other.

Therefore, the groove bottoms 4 are waved by the small ribs without forming sharp corners or angled corners. As a results, stress is effectively dispersed to prevent the groove bottom from cracking.

Comparison Tests

Test tires having the following same construction and the same tread pattern of FIG. 1 except for the small ribs were made by way of test, and tested for the durability. In the durability test, the runable distance was measured using an indoor drum tester, and the groove bottom was checked.

Carcass: Two plies of 1100 d nylon cords turned up around bead cores

Cord angle: 90 degrees to the tire equator

Cord count: 48/5 cm

Belt: One ply of spirally wound 1400 d nylon cords

Cord count: 49/5 cm

Tire size: 225/50ZR16 (passenger car tire)

Rim size: 16X7JJ (standard rim)

Inner pressure: 2.0 kgf/sq.cm

Tire load: 737 kgf

Running speed: 80 km/h

Running distance: 50000 km (increased from the usual distance of 30000 km)

TABLE

Figure 7:
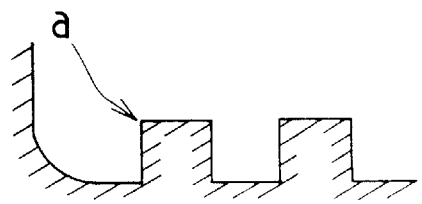
FIG. 7 is a cross sectional view showing the ribs of a reference tire used in a comparison test.

| Tire | Rib | No. of ribs | W(mm) | H(mm) | Durability runable distance, crack(size) & damage |
|---|---|---|---|---|---|
| Ex. 1 | FIG. 2 | 7 | 1 | 0.5 | 50000 km non |
| Ex. 2 | FIG. 2 | 7 | 1.5 | 0.5 | 50000 km non |
| Ex. 3 | FIG. 2 | 7 | 1 | 1 | 50000 km non |
| Ex. 4 | FIG. 2 | 2 | 1 | 0.5 | 50000 km substantially non |
| Ex. 5 | FIG. 2 | 5 | 1 | 0.5 | 50000 km non |
| Ex. 6 | FIG. 2 | 8 | 1 | 0.5 | 50000 km non |
| Ex. 7 | FIG. 2 | 9 | 1 | 0.5 | 50000 km non |
| Ex. 8 | FIG. 2 | 11 | 1 | 0.5 | 50000 km non |
| Prior | — | 0 | — | — | 40000 km 0.7 mm |
| Ref. 1 | FIG. 2 | 7 | 2 | 0.5 | 50000 km 0.2 mm |
| Ref. 2 | FIG. 2 | 7 | 2.5 | 0.5 | 50000 km 0.5 mm |
| Ref. 3 | FIG. 2 | 7 | 1 | 1.5 | 45000 km tread separation due to heat generation |
| Ref. 4 | FIG. 2 | 7 | 1 | 2 | 40000 km tread separation due to heat generation |
| Ref. 5 | FIG. 2 | 7 | 0.9 | 0.5 | 50000 km non |
| Ref. 6 | FIG. 2 | 7 | 1.6 | 0.5 | 50000 km 0.1 mm |
| Ref. 7 | FIG. 2 | 7 | 1 | 0.4 | 50000 km non |
| Ref. 8 | FIG. 2 | 7 | 1 | 1.1 | 50000 km small tread separation due to heat generation |
| Ref. 9 | FIG. 7 | 7 | 1 | 0.5 | 45000 km 0.5 mm |
| Ref. 10 | FIG. 2 | 1 | 1 | 0.5 | 50000 km 0.5 mm |

Ex. 7: It was somewhat difficult to make the mold. The production efficiency was lower than Exs.1 to 6.

Ex. 8: It was difficult to make the mold. The production efficiency was lower than Ex.7.

Ref.5 & 7: It was difficult to make the mold. The production efficiency is poor in comparison with Exs.1 to 3.

What is claimed is:

1. A pneumatic tire comprising a tread portion having a tread surface and provided with a plurality of longitudinal grooves, each longitudinal groove extending continuously in the circumferential direction of the tire and having a bottom and a pair of sidewalls defining corners therebetween, each of said corners being rounded with a circular arc having a radius of not more than 2 mm, inclination angles of said sidewalls being in the range of not more than 15 degrees with respect to the normal direction to the tread surface, said bottom provided with a plurality of ribs extending in the longitudinal direction of the groove and being substantially parallel with each other so that the bottom has a wavy configuration having no angled corner, when viewed from a cross sectional perspective, and outermost valleys between the sidewalls and ribs and intermediate valleys between the ribs are defined, and the heights of the ribs measured from the deepest point of the longitudinal groove being in the range of from 0.5 to 1.0 mm, wherein the intermediate valleys are deeper than the outermost valleys.

2. A pneumatic tire according to claim 1, wherein said sidewalls are inclined at an angle of more than 0 degrees but not more than 15 degrees with respect to the normal direction to the tread surface so that the groove width increases radially outwardly.

3. A pneumatic tire according to claim 1 or 2, wherein said wavy configuration consists of alternate convex curves and concave curves.

4. A pneumatic tire according to claim 3, wherein said wavy configuration is a series of semicircles.

5. A pneumatic tire according to claim 1 or 2, wherein said wavy configuration consists of curved parts and flat parts, the flat parts located on both sides of the ribs and being parallel with the radial direction of the tire.

6. A pneumatic tire comprising a tread portion having a tread surface and provided with a plurality of longitudinal grooves, each longitudinal groove extending continuously in the circumferential direction of the tire and having a bottom and a pair of sidewalls defining corners therebetween, each of said corners being rounded with a circular arc having a radius of not more than 2 mm, inclination angles of said sidewalls being in the range of not more than 15 degrees with respect to the normal direction to the tread surface, said bottom provided with a plurality of ribs extending in the longitudinal direction of the groove and being substantially parallel with each other so that the bottom has a wavy configuration having no angled corner, when viewed from a cross sectional perspective, and outermost valleys between the sidewalls and ribs and intermediate valleys between the ribs are defined, wherein the intermediate valleys are deeper than the outermost valleys, said wavy configuration is substantially a rectangular wave configuration, and the heights of the ribs measured from the deepest point of the longitudinal groove being in the range of from 0.5 to 1.0 mm.

* * * * *